(12) United States Patent
Suddreth et al.

(10) Patent No.: US 8,519,997 B2
(45) Date of Patent: Aug. 27, 2013

(54) APPARATUS AND METHOD FOR DISPLAY AND FUNCTIONALITY OF A VEHICLE DISPLAY SYSTEM CURSOR CONTROL DEVICE

(75) Inventors: John F. Suddreth, Cave Creek, AZ (US); Gang He, Morristown, NJ (US); Kenneth M. Leiphon, Phoenix, AZ (US); Ivan Sandy Wyatt, Scottsdale, AZ (US); Jary E. Engels, Peoria, AZ (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 820 days.

(21) Appl. No.: 12/235,769

(22) Filed: Sep. 23, 2008

(65) Prior Publication Data

US 2010/0073359 A1 Mar. 25, 2010

(51) Int. Cl.
*G06T 15/00* (2011.01)

(52) U.S. Cl.
USPC .......................................... 345/419; 715/700

(58) Field of Classification Search
USPC .......................................... 345/419; 715/700
See application file for complete search history.

(56) References Cited

U.S. PATENT DOCUMENTS

| | | | |
|---|---|---|---|
| 5,264,836 A | 11/1993 | Rubin | |
| 5,745,863 A | 4/1998 | Uhlenhop et al. | |
| 5,808,604 A | 9/1998 | Robin | |
| 5,999,165 A | 12/1999 | Matsumoto | |
| 6,023,275 A | 2/2000 | Horvitz et al. | |
| 6,317,144 B1 | 11/2001 | Pabla et al. | |
| 6,469,660 B1 | 10/2002 | Horvath et al. | |
| 6,633,810 B1* | 10/2003 | Qureshi et al. | 701/467 |
| 6,995,746 B2 | 2/2006 | Aymeric | |
| 7,126,579 B2 | 10/2006 | Ritter | |
| 7,142,131 B2 | 11/2006 | Sikora | |
| 7,158,151 B2 | 1/2007 | Asami | |
| 7,162,335 B2 | 1/2007 | He et al. | |
| 7,286,062 B2 | 10/2007 | Feyereisen et al. | |
| 7,693,615 B2* | 4/2010 | Chen et al. | 701/3 |
| 2004/0158363 A1 | 8/2004 | Lafon et al. | |
| 2004/0158364 A1 | 8/2004 | Lafon et al. | |
| 2005/0099433 A1* | 5/2005 | Berson et al. | 345/619 |
| 2006/0195234 A1 | 8/2006 | Chen et al. | |
| 2007/0001874 A1 | 1/2007 | Feyereisen et al. | |
| 2007/0002078 A1* | 1/2007 | He et al. | 345/633 |
| 2008/0198157 A1 | 8/2008 | Feyereisen et al. | |

FOREIGN PATENT DOCUMENTS

EP 1959239 A1 8/2008

OTHER PUBLICATIONS

European Patent Office, European Search Report for Application No. 09170372.8-1236/2166311 dated Oct. 5, 2012.
European Patent Office, European Examination Report for Application No. 09170372.8-1236/2166311 dated Nov. 7, 2012.

* cited by examiner

*Primary Examiner* — Kimbinh T Nguyen
(74) *Attorney, Agent, or Firm* — Ingrassia Fisher & Lorenz, P.C.

(57) ABSTRACT

A display system for use on a vehicle is presented. The display system comprises a cursor control device, at least one electronic display for displaying a first image comprising a three-dimensional conformal view of a terrain and a first movable cursor, and a processor that is coupled to the cursor control device and the at least one electronic display. The processor is configured to move the first movable cursor on the first image in response to input from the cursor control device and to determine a latitude and longitude that correspond to the position of the first movable cursor.

16 Claims, 3 Drawing Sheets

APPARATUS AND METHOD FOR DISPLAY AND FUNCTIONALITY OF A VEHICLE DISPLAY SYSTEM CURSOR CONTROL DEVICE

TECHNICAL FIELD

The present invention generally relates to display systems for aircraft, and more particularly relates to an apparatus and method for setting a waypoint.

BACKGROUND

Modern aircraft display systems are capable of displaying a considerable amount of information such as aircraft position, attitude, navigation, and terrain information. Most such displays additionally allow a flight plan to be displayed from different views, such as a perspective view or primary flight display, a vertical situation display, or a lateral situation display, that can be displayed individually or simultaneously. The vertical situation display and the lateral situation display are two-dimensional views of the aircraft flight plan, and may include, for example, an aircraft symbol, waypoint symbols, line segments that interconnect the waypoint symbols, and/or range rings. These views may also include various map features including, for example, weather information, terrain information, political boundaries, and navigation aids.

The vertical situation display and lateral situation display may also provide a user interface that allows the pilot or co-pilot of the aircraft to monitor and/or change the flight plan and/or path. For example, the pilot or co-pilot may maneuver a cursor to select a waypoint symbol on one of these views, resulting in the creation of a pop-up menu. The pilot or co-pilot can then interact with various menus to view the details of, or modify, an existing waypoint. Further, the pilot or co-pilot is able to utilize the user interface to create additional waypoints. For example, the pilot or co-pilot might interact with a selectable menu on the second image to provide the information necessary (e.g., latitude, longitude, and altitude) to set the waypoint. A new waypoint symbol would then appear in the appropriate location on the second image. Alternatively, the pilot or co-pilot might maneuver the cursor to the desired location of the vertical situation display or the lateral situation display and provide an input (e.g., click a button) resulting in the generation of a pop-up menu. The pilot or co-pilot may then interact with various pop-up menus to create the new waypoint.

Although the present method for creating, or modifying, a waypoint using the second image is effective, it does suffer certain drawbacks. For instance, because the user interface is menu-based, the pilot or co-pilot must divert attention away from other important flight procedures so that he or she may interact with the menus and dialog boxes when adding, or modifying, a waypoint. In addition, because each of these views provides only a two-dimensional view of the flight plan, they cannot provide the pilot or co-pilot with a visual representation of the position (e.g., latitude, longitude, and altitude) of a waypoint with respect to position of the aircraft, the other waypoints, or other aspects of the flight path for aircraft.

Accordingly, it is desirable to provide an apparatus for setting a waypoint for an aircraft without requiring the pilot or co-pilot to interact with a menu-based user interface. In addition, it is also desirable to provide a method for generating a new waypoint for an aircraft that provides the pilot or co-pilot with a visual representation of the relative position of the new waypoint. Furthermore, other desirable features and characteristics of the present invention will become apparent from the subsequent detailed description of the invention and the appended claims, taken in conjunction with the accompanying drawings and this background of the invention

BRIEF SUMMARY

A display system for a vehicle is provided. The display system comprises a cursor control device, at least one electronic display for displaying a first image comprising a three-dimensional conformal view of a terrain and a first movable cursor, and a processor, coupled to the cursor control device and the at least one electronic display, wherein the processor is configured to move the first movable cursor on the first image in response to input from the cursor control device and to determine a latitude and longitude that correspond to the position of the first movable cursor.

In other embodiments, a method for setting a waypoint for an aircraft is provided. The method comprises positioning a first movable cursor on a first image displayed on an electronic display in response to command signals from a cursor control device, wherein the movement of the first movable cursor is confined to a region of the first image that depicts a three-dimensional conformal view of a terrain in front of the aircraft, displaying a visual indicator that extends upwardly from the first movable cursor to a desired position in response to command signals from an altitude control, displaying a first visual indicator that extends upwardly from the first movable cursor to a desired position on the first image in response to command signals from an altitude control, and associating a latitude and a longitude with the position of the first movable cursor and an altitude value with the position of the first visual indicator.

BRIEF DESCRIPTION OF THE DRAWINGS

The present invention will hereinafter be described in conjunction with the following drawing figures, wherein like numerals denote like elements.

DETAILED DESCRIPTION

Figure 1:
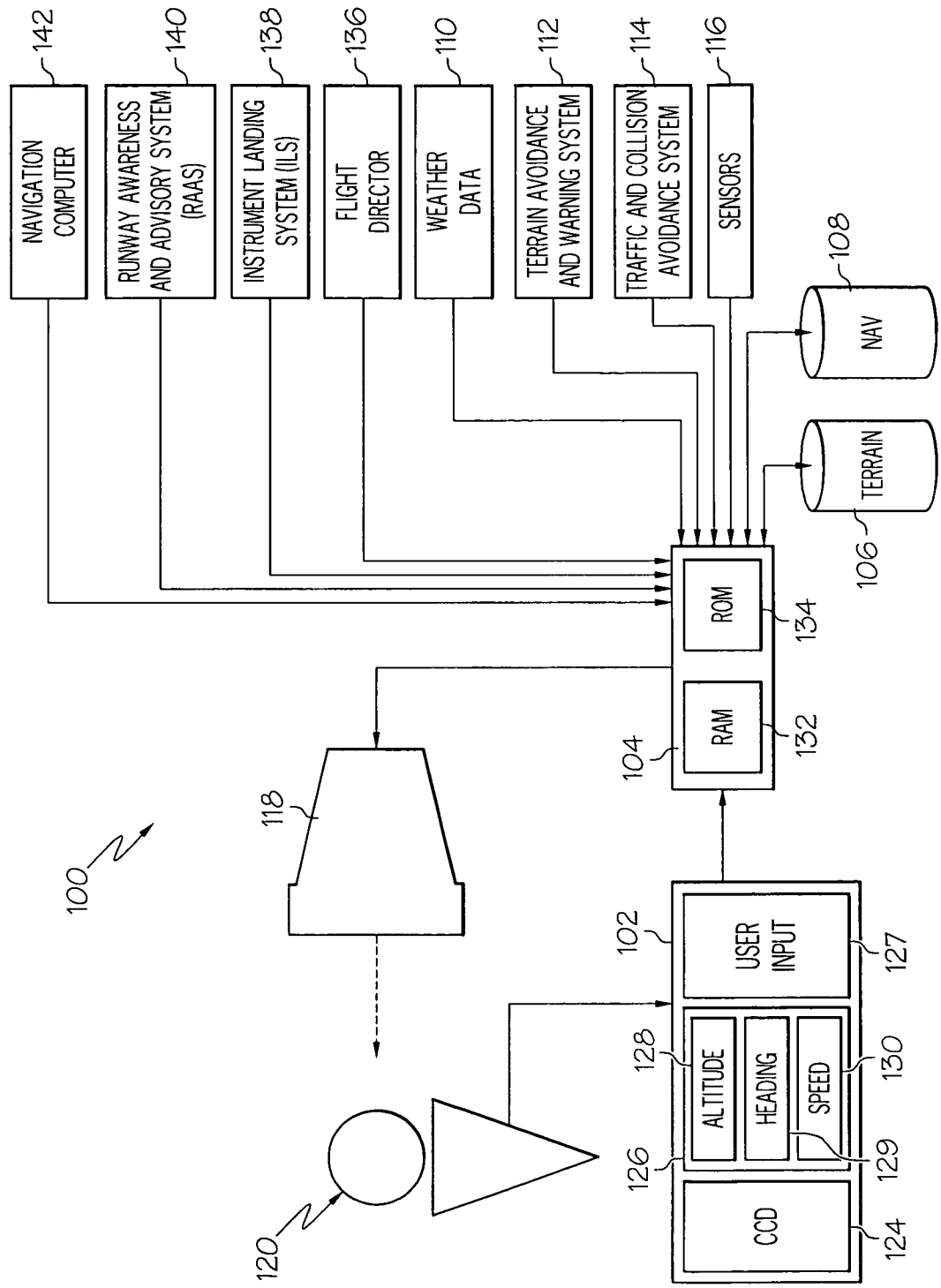
FIG. 1 is a block diagram of an exemplary flight display system.

The following detailed description is merely exemplary in nature and is not intended to limit the invention or the application and uses of the invention. Furthermore, there is no intention to be bound by any expressed or implied theory presented in the preceding technical field, background, brief summary, or the following detailed description. Additionally, although the invention is described below as being implemented in an aircraft, it will be appreciated that any other manned or unmanned vehicles, such as watercraft and spacecraft, may alternatively incorporate the invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing, figures, or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary display system 100 for a vehicle will be described. As used herein, the term "vehicle" refers to any type of vehicle that is configured to travel above a terrain, such as a manned or unmanned aircraft, rocket, missile, space vehicle, or a submerged vessel. The embodiment described herein will be with regard to an aircraft that is flying over a terrain, but it will be understood by one who is skilled in the art that embodiments of the present invention may also be used in connection with other vehicles. The display system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, various sensors 116, and at least one electronic display 118.

The user interface 102 is in operable communication with the processor 104 and is configured to receive input from a user 120 (e.g., a pilot or a co-pilot) and, in response, to supply command signals to the processor 104. The user interface 102 comprises a cursor control device (CCD) 124, a secondary interface 126, and additional user input interface 127. The CCD 124 may be any one, or a combination, of various known cursor control devices, including, but not limited to, a trackball, a joystick, and/or one or more buttons, switches, or knobs. As described further below, the CCD 124 supplies command signals to the processor 104 for controlling the movement of at least one movable cursor on the at least one electronic display 118.

The secondary interface 126 comprises a plurality of controls for providing command signals to the processor 104 regarding the position and other characteristics of a cursor (described below with regard to FIG. 2) on the at least one electronic display 118. In the illustrated embodiment, the secondary interface 126 comprises an altitude control 128, a heading control 129, and a speed control 130. These controls 128-130 may comprise rotatable knobs, dials, bi-directional switches, buttons, or any other type of control that is suitable for providing input regarding the altitude, heading, or speed of an aircraft. The secondary interface 126 may be a separate set of controls or it may be combined with one or more controls that perform similar functions. For example, in one embodiment, the altitude, heading, and speed controls 128-130 are combined with one or more controls on a guidance panel that the pilot 120 uses to provide input to the flight director (described below) regarding the desired altitude, heading, or speed of the aircraft. In this embodiment, the guidance panel may operate in more than one mode, including a first mode for allowing the pilot 120 to perform the functions described below and a second mode for providing input to the flight director.

The processor 104 is in operable communication with the terrain databases 106, the navigation databases 108, and the at least one electronic display 118, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to the at least one electronic display 118, so that the retrieved terrain and navigation data are appropriately displayed on the at least one electronic display 118. As FIG. 1 additionally shows, the processor 104 is also in operable communication with the source of weather data 110, the TAWS 112, the TCAS 114, and is additionally configured to supply appropriate display commands to the at least one electronic display 118 so that the avionics data, weather data 110, data from the TAWS 112, data from the TCAS 114, and data from the previously mentioned external systems may also be selectively displayed on the electronic display 118. The preferred manner in which the terrain and navigation data are displayed on the display will be described in detail further below.

The processor 104 may be any one of numerous known general-purpose microprocessors or an application specific processor that operates in response to program instructions. In the depicted embodiment, the processor 104 includes on-board RAM (random access memory) 132 and on-board ROM (read only memory) 134. The program instructions that control the processor 104 may be stored in either or both the RAM 132 and the ROM 134. For example, the operating system software may be stored in the ROM 134, whereas various operating mode software routines and various operational parameters may be stored in the RAM 132. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data, including elevation data, representative of the terrain over which the aircraft is flying, and the navigation databases 108 include various types of navigation-related data. This navigation-related data includes various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 132, or integrally formed as part of the processor 104, and/or RAM 132, and/or ROM 134. The terrain databases 106 and navigation databases 108 could also be part of a device or system that is physically separate from the display system 100.

The avionics data that is supplied from the sensors 116 includes data representative of the state of the aircraft such as, for example, aircraft speed, altitude, and heading. The weather data 110 supplied to the processor 104 is representative of at least the location and type of various weather cells.

The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the at least one electronic display 118 such that a graphic representation of each aircraft in the vicinity is displayed on the at least one electronic display 118. The TAWS 112 supplies data representative of the location of terrain that may be a threat to the aircraft. The processor 104, in response to the TAWS data, preferably supplies appropriate display commands to the at least one electronic display 118 such that the potential threat terrain is displayed in various colors depending on the level of threat.

As was previously alluded to, one or more other external systems (or subsystems) may also provide avionics-related data to the processor 104 for display on the electronic display 118. In the depicted embodiment, these external systems include a flight director 136, an instrument landing system (ILS) 138, a runway awareness and advisory system (RAAS) 140, and a navigation computer 142. The flight director 136, as is generally known, supplies command data representative of commands for piloting the aircraft in response to flight crew entered data, or various inertial and avionics data received from external systems. For example, as previously mentioned, the pilot 120 may utilize a guidance panel to provide input regarding the desired speed, altitude, and/or heading of the aircraft. In response, the flight director 136 supplies command data that is representative of that user input. The command data supplied by the flight director 136 may be supplied to the processor 104 and displayed on the at least one electronic display 118 for use by the pilot 120, or the data may be supplied to an autopilot (not illustrated). The autopilot, in turn, produces appropriate control signals which are applied to the aircraft's flight control surfaces to cause the aircraft to fly in accordance with the flight crew entered data, or the inertial and avionics data.

The ILS 138 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 138 on board the aircraft receives these signals and supplies appropriate data to the processor for display of, for example, an ILS feather (not illustrated in FIG. 1) on the electronic display 118. The ILS feather represents two signals, a localizer signal that is used to provide lateral guidance, and a glide slope signal that is used for vertical guidance.

The RAAS 140 provides improved situational awareness to help lower the probability of runway incursions by providing timely aural advisories to the flight crew during taxi, takeoff, final approach, landing and rollout. The RAAS 140 uses GPS data to determine aircraft position and compares aircraft position to airport location data stored in the navigation database 108. Based on these comparisons, the RAAS 140, if necessary, issues appropriate aural advisories. The aural advisories the RAAS 140 may issue inform the pilot 120, among other things of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when the pilot 120 inadvertently begins to take off from a taxiway, and when an aircraft has been immobile on a runway for an extended time.

The navigation computer 142 is used, among other things, to allow the pilot 120 to program a flight plan from one destination to another. The navigation computer 142 may be in operable communication with the flight director 136. As was mentioned above, the flight director 136 may be used to automatically fly, or assist the pilot 120 in flying, the programmed route. The navigation computer 142 is in operable communication with various databases including, for example, the terrain database 106, and the navigation database 108. The processor 104 may receive the programmed flight plan data from the navigation computer 142 and cause programmed flight plan, or at least portions thereof, to be displayed on the electronic display 118.

The at least one electronic display 118 is used to display various images and data, in both a graphical and a textual format, and to supply visual feedback to the pilot 120 in response to the user input commands supplied by the pilot 120 to the user interface 102. It will be appreciated that the at least one electronic display 118 may be any one of numerous known displays suitable for rendering image and/or text data in a format viewable by the pilot 120. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, the at least one electronic display 118 includes a panel display. A general description of the at least one electronic display 118 and its layout will now be provided.

Figure 2:
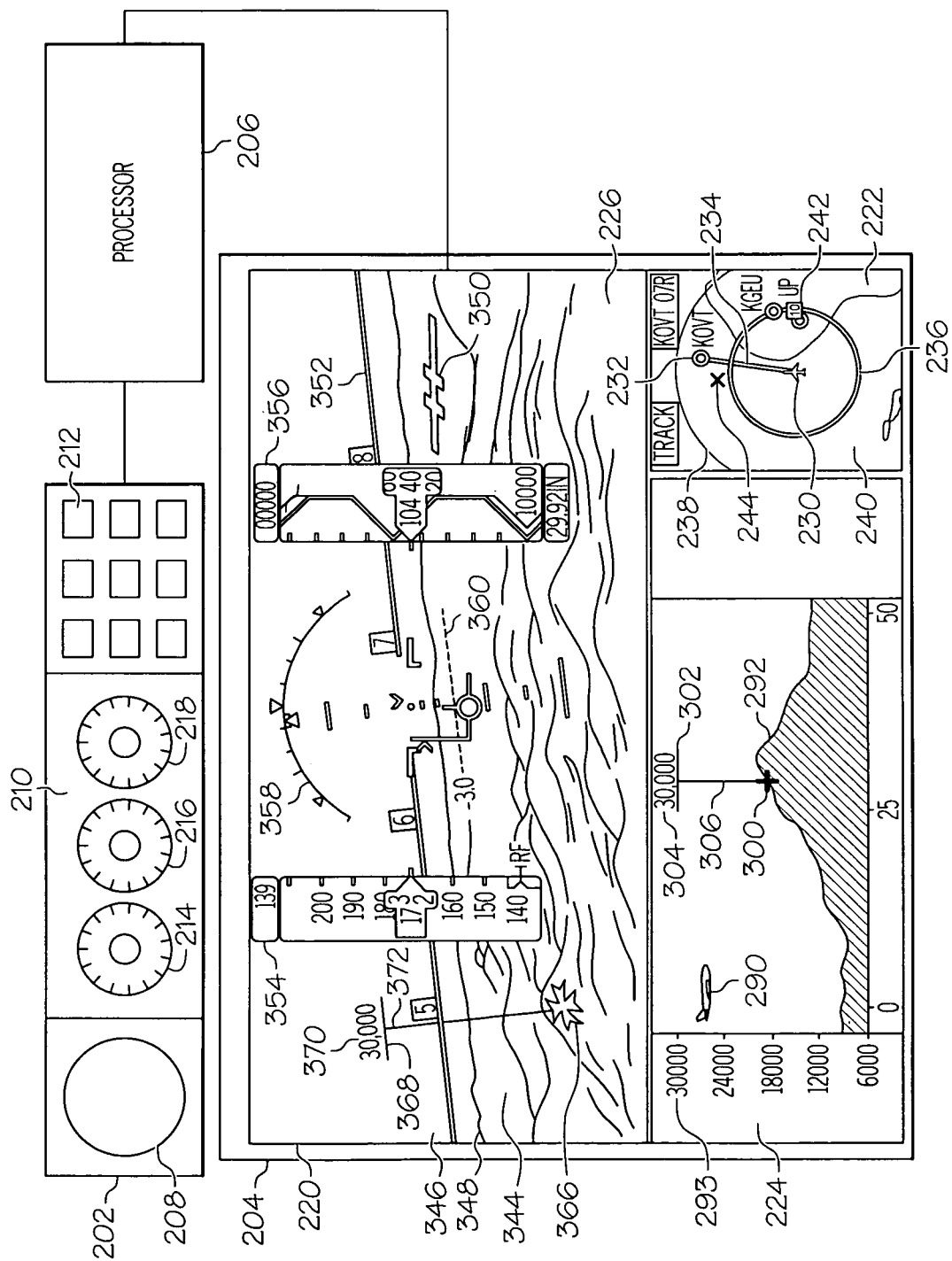
FIG. 2 is a block diagram of an exemplary user interface and electronic display for use with the flight display system of FIG. 1.

FIG. 2 is a simplified representation of an exemplary user interface 202 and electronic display 204 that may be used in the system of FIG. 1. The user interface 202 is coupled to the electronic display 204 via a processor 206. As depicted, the user interface includes the CCD 208, the secondary interface 210, and additional user input controls 212. The secondary interface 210 comprises the speed control 214, the heading or track control 216, and the altitude 218. As depicted, the CCD 208 comprises a trackball control and the speed, heading or track, and altitude controls 214, 216, 218 each comprise a rotatable knob. The depicted additional user input controls 212 comprise a plurality of buttons.

The electronic display 204 includes a display area 220 in which multiple graphical and textual images may be simultaneously displayed. For example, a first image 222 (e.g., vertical situation view), a second image 224 (e.g., a lateral situation view), and a third image 226 (e.g., a perspective view or primary flight view) may be displayed simultaneously, singly, or in various combinations, in various sections of the display area 220. In some embodiments of the flight display system may include more than one electronic display 204, each comprising a display area 220 for displaying a separate graphical and/or textual image. For example, in one embodiment, the flight display system may comprise two electronic displays; one for displaying the first and/or second images 222, 224 and a second one for displaying the third image 226.

In addition, the display area 220 may include other images for depicting data related to the flight plan of the aircraft. Such data may include, but is not limited to, the flight identifier, a route iteration number, a waypoint list, and associated information, such as bearing and time to arrival.

The first image 222 includes a top-view aircraft symbol 230, and at least portions of a flight plan represented by one or more waypoint symbols 232, interconnecting line segments 234, and one or more range rings 236, 238. The first image 222 also includes various map features including, but not limited to, a lateral two-dimensional view of the terrain 240 below the flight plan derived by the processor 206 using the data from the terrain database 106 (FIG. 1). The range rings 236, 238 may be used to indicate sequential ranges, such as fixed distance or time ranges needed to travel from the top-view aircraft symbol 230 to another position on the terrain 240, or any other information that may be useful to a pilot or co-pilot. In the illustrated embodiment, the range rings 236, 238 indicate distances from the aircraft symbol 230. Range ring 236 includes a range indicator 242, which displays the lateral distance from the aircraft's present position to the position on the first image 222 that corresponds to the range ring 236 (e.g., 10 nautical miles).

The first image 222 also includes a movable cursor 244 that is controlled by the pilot or the co-pilot via the CCD 208 or other suitable control device. The movement of cursor 244 is confined to the first image 222. The processor 206 determines a latitude and a longitude that correspond to the position of cursor 244 on the terrain 240. In one embodiment, the scale of the terrain 240 of the first image 222 may change based on the distance between the latitude and longitude of cursor 244 and the latitude and longitude of the aircraft. Further, in the depicted embodiment cursor 244 is shown as a symbol "X," however, it will be understood by one who is skilled in the art that it may be any shape or symbol that is suitable for marking a position on a terrain. In some embodiments the shape of cursor 244 changes when it is placed at a significant location the first image 222 (e.g., the position of an existing waypoint) or to conform to the underlying terrain 240.

The second image 224 includes a side-view aircraft symbol 290, an underlying two-dimensional terrain 292 derived by the processor 206 using data from the terrain database 106 (FIG. 1), and an altitude scale 293 for providing a visual reference for the altitude of the aircraft 290. In addition, the second image 224 includes a movable cursor 300 that is controlled by the pilot or the co-pilot via the CCD 208 or other suitable control device. The processor 206 determines a latitude and a longitude based on the position of cursor 300 on the terrain 292.

The terrain 292 may be a representation of the contour of the actual terrain below the flight plan for the aircraft or it may be a representation of the contour of the actual terrain on a line that extends through the latitude and longitude of the aircraft and the current latitude and longitude of the cursor 300. Thus, as cursor 300 moves the contour of terrain 292 may change to reflect the actual terrain on a straight line path between the latitude and longitude of the aircraft and the latitude and longitude of cursor 300 or the. As with the first image 222, the scale of the terrain 292 of the second image 224 may change based on the distance between the latitude and longitude of cursor 300 and the present latitude and longitude of the aircraft.

FIG. 2 depicts a first embodiment of the electronic display 204 in which movement of cursor 300 is confined to the horizon of terrain 292 as it moves across the second image 224. It should be noted that while in the depicted embodiment, cursor 300 is the symbol "X" in other embodiments cursor 300 may be any shape of symbol that is suitable for marking a location on a terrain.

In addition, the processor 206 determines an altitude value that corresponds with cursor 300. In the depicted embodiment, a visual indicator 302 extends upwardly from cursor 300 to a position that represents the altitude value. As shown, visual indicator 302 may comprise a line segment. The visual indictor 302 may also include an altitude indicator 304 for displaying the altitude and an upwardly extending line 306 connecting cursor 300 to visual indicator 302.

In some embodiments, the appearance of cursor 300 and visual indicator 302 change based on their positions. For example, in one embodiment the shape of cursor 300 may change to conform to the underlying terrain 292. Further, the appearance of cursor 300 or visual indicator 302 may change when their positions overlap with the position of significant locations on the second image 224.

The third image 226 includes at least two regions: a lower region 344 that provides a three-dimensional conformal view of a portion of the terrain below the aircraft and/or the flight plan and an upper region 346 that depicts the atmosphere above the terrain 344. These regions are separated by a horizon 348 on the third image 226. In addition, the terrain 344 may include symbols 350 that represent airports, political boundaries, and other navigational aids. The three-dimensional conformal view of the terrain 344 is derived by the processor 206 using data from the terrain database 106 (FIG. 1). It will be appreciated that the processor 206 may implement any one of numerous types of image rendering methods to process terrain data from the terrain database 106 (FIG. 1) and render the three-dimensional conformal view of the terrain 344.

The third image 226 may also include conventional primary flight display symbology. For example, the third image 226 may include a heading indicator line 352. Preferably, the heading indicator line 352 is depicted slightly above the horizon 348. The third image 226 may also include other conventional symbology, including, but not limited to, an air speed tape 354, an altitude tape 356, a bank indicator 358, and a compass 360.

Further, as depicted in FIG. 2, the third image 226 includes a movable cursor 366. Cursor 366 is displayed behind the other flight symbology on the third image 226. The processor 206 determines a latitude and a longitude based on the position of cursor 366. In the embodiment of the electronic display 204 depicted in FIG. 2, cursor 366 cannot be moved into the portion of the third image 226 that depicts the atmosphere 346. Thus, movement of cursor 366 on the third image is confined to the terrain 344.

The processor 206 also determines an altitude value that corresponds to the cursor 366. In the depicted embodiment, a visual indicator 368 extends upwardly from the cursor 366 to a position that represents the altitude value. As shown, visual indicator 368 may be a line segment that is positioned above cursor 366 at a location that corresponds to the altitude value on the third image 226. However, it should be understood that visual indicator 368 may be any symbol that is suitable for marking a position on an image. In addition, the depicted visual indicator 368 also includes an altitude indicator 370 for displaying the altitude value and an upwardly extending line 372 connecting the visual indicator 368 to cursor 366.

The appearance of cursor 366 and the visual indicator 368 may change based on their positions. For example, the shape of the cursor 366 may change to conform to the contour of the underlying terrain 344 as it moves across the third image 226. In addition, the appearance of the cursor 366 or visual indicator 368 may change if their positions overlap with the position of a particular location or symbol 350 on the third image 226, such as an airport or an existing waypoint. The appearance of cursor 366 or visual indicator 368 may also change to increase its visibility when it is activated by the pilot or co-pilot. Finally, in some embodiments a visual cue may appear on the third image 226 when the position of the cursor 366 or visual indicator 368 overlaps with a significant position, such as an existing waypoint or a projected glide path for the aircraft. The visual cue may comprise a symbol or shape, or it may comprise a visual effect such as a blister or a bubble.

Figure 3:
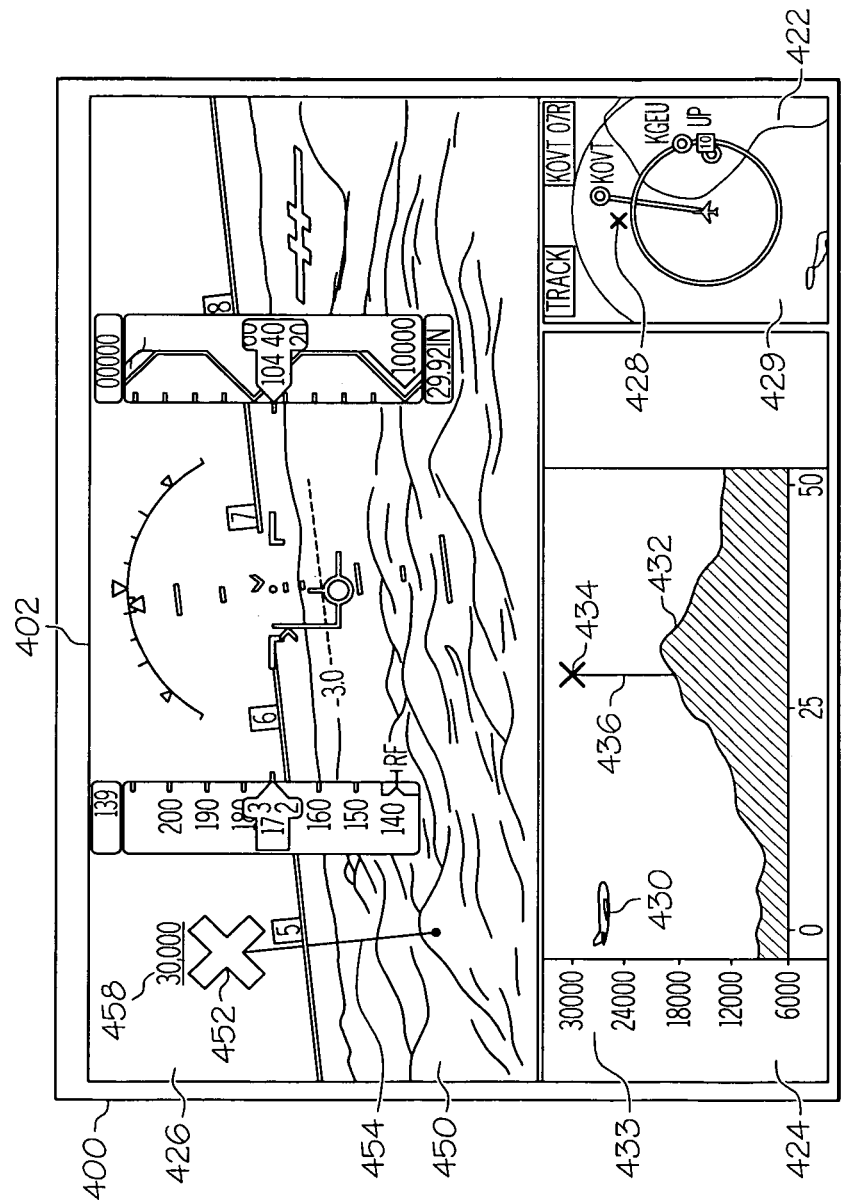
FIG. 3 is a block diagram of an exemplary electronic display according to a second embodiment of the present invention.

Other cursor configurations for the second and third images 224 and 226 may also be used. FIG. 3 is a depiction of an electronic display 400 according to a second embodiment of the electronic display 400. As depicted, the electronic display 400 includes a display area 402 having a first image 422, a second image 424, and third image 426. The first image 422 includes a movable cursor 428 that is associated with a latitude and a longitude on the underlying terrain 429. The second image 424 includes a side-view aircraft symbol 430, a terrain 432, an altitude scale 433, and a movable cursor 434. In this second embodiment, cursor 434 may be positioned on or above the terrain 432. The processor 206 converts the position of cursor 434 with respect to the terrain 432 into a latitude and a longitude and the position of cursor 434 above the terrain into an altitude value. In addition, a line 436 extends between cursor 434 and the terrain 432 to provide the pilot or co-pilot with a visual indication of the location of cursor 434 with respect to the terrain 432. In some cases, the line 436 is only visible when the cursor 434 is stationary.

The third image 426 comprises a three-dimensional conformal view of a terrain 450 and a movable cursor 452. Cursor 452 may be positioned on or above the terrain 450. The processor 206 converts the position of cursor 452 with respect to the terrain 450 into a latitude and a longitude and the position of cursor 452 above the terrain into an altitude value. A line 454 extends between cursor 452 and the terrain 450 to provide the pilot or co-pilot with a visual indication of the location of cursor 452 with respect to the terrain 450. In some cases, the line 454 is only visible when the cursor 452 is stationary. An altitude indicator 458 is also depicted for displaying the altitude.

Embodiments of the present invention are described below with reference to the first embodiment of the electronic display 204 of FIG. 2. However, it should be understood that these embodiments may also be applied to the second embodiment of the electronic display 400 of FIG. 3, to the extent that, as with cursors 300 and 366 of FIG. 2, cursors 434 and 452 of FIG. 3 also correspond to a latitude, a longitude, and an altitude value on their respective images 424, 426.

Returning to FIG. 2, the CCD 208 provides command signals to the processor 206 regarding the positions of cursors 244, 300, and 366 on their respective displays 222, 224, 226. In response to these command signals, the processor 206 moves cursors 244, 300, and 366 to a desired latitude and longitude on their respective terrains 240, 292, and 344.

In one embodiment, the positions of cursors 244, 300, and 344 correspond at all times to the same latitude (e.g., L1) and longitude (e.g., L2) on images 222, 224, and 226. In this case, cursors 244, 300, and 366 move in synchronization when the pilot or co-pilot actuates the CCD 208. For example, the pilot or co-pilot may maneuver cursor 366 to a desired L1 and L2 on the terrain 344 of the third image 226. This movement of cursor 366 will be accompanied by a corresponding movement of cursors 244 and 300 on the first and second images 222, 224, respectively. Further, the pilot or co-pilot may maneuver cursors 244, 300, and 366 to a position (e.g., L1 and L2) that does not correspond to a position on the terrain 344 depicted in the third image 226. In this case, cursor 366 moves off of, and is not depicted on, the third image 226 until cursors 244, 300, and 366 are moved to a position that corresponds to the terrain 344.

In addition, CCD 208 may operate in more than one mode. For example, in a first mode CCD 208 may control the position (e.g., the latitude and longitude) of cursors 244, 300, and 366 as described above. Further, in a second mode CCD 208 may control the altitude values for cursors 300 and 366 (e.g., the positions of visual indicators 302 and 368).

The altitude control 218 provides command signals to the processor 206 regarding the altitude values for cursors 300 and 366. In one embodiment, visual indicators 302 and 368 may correspond at all times to the same altitude value (A). For example, visual indicators 302 and 368 may move upwardly and the value of A may increase when the altitude control 218 is rotated in a first direction. Further, visual indicators 302 and 368 may move downwardly and the value of A may decrease when the altitude control 218 is rotated in the other direction. The value of A may be a barometric altitude or the geometric altitude. It should be noted that A may also be adjusted by any other suitable control, for example the CCD 208 may include an additional control such as a rotary dial for adjusting A.

The heading or track control 216 provides command signals to the processor 206 regarding the heading between the aircraft and the latitude and longitude that correspond to cursors 244, 300, and 366 (e.g., L1 and L2). Upon activation of the heading or track control 216, cursors 244, 300, and 366 move on their respective terrains 240, 292, 344 in such a manner that the distance between the present latitude and longitude coordinates of the aircraft and L1 and L2 remains fixed.

For example, upon actuation of the heading or track control 216 cursor 244 moves in a circle having its radius at the center of the aircraft symbol 230. Further, cursor 366 moves across the terrain 344 of the third image 226 in such a manner that the distance between the latitude and longitude that correspond to cursor 366 and the present latitude and longitude of the aircraft remains constant. Finally, cursor 300 remains at a fixed distance from the present latitude and longitude of the aircraft symbol 290 and the contour of the terrain 292 changes to correspond to the contour of the actual terrain on a line between the latitude and longitude of the aircraft and latitude and longitude for with position of cursor 300 (e.g., L1 and L2).

The secondary interface 210 may also include additional controls for associating other characteristics with position of the cursors 244, 300, 366. For example, the depicted secondary interface 210 includes a speed control 214 for associating a speed value (S) with the coordinates L1, L2, and A. In one embodiment, S represents a desired air speed at which the aircraft might travel toward L1, L2, and A.

The CCD 208 and the secondary user interface 210 enable the pilot or co-pilot to create a new waypoint, or alter an existing waypoint, using the cursors 244, 300, and 344 of the first, second, and third images 222, 224, 226. For example, the pilot or co-pilot may maneuver cursor 366 to a desired position (e.g., L1 and L2) on the terrain 344 of the third image 226. As discussed above, in one embodiment cursors 244 and 300 move to corresponding positions on the first and second images 222, 224. Thus, all three cursors 244, 300, and 344 provide the pilot or co-pilot with an accurate visual representation of the position of L1 and L2 with respect to the aircraft or any obstacles in its path.

Next, the pilot or co-pilot may then utilize the secondary interface 210. For example, the pilot of co-pilot may actuate the heading or track control 216, resulting in a synchronized movement of cursors 244, 300, and 366 such that the distance between the current latitude and longitude of the aircraft and L1 and L2 remains constant. Further, the pilot or co-pilot may actuate the altitude control 218 to adjust the position of visual indicators 302 and 368 to a desired altitude value (e.g., A) as described above. The positions of visual indicators 302 and 368 provide the pilot or co-pilot with an accurate visual representation of the position described by the coordinates L1, L2, and A with respect to the altitude of the aircraft and any intervening obstacles. Finally, the pilot or co-pilot may actuate the speed control 214 to associate a speed value (e.g., S) with the position of coordinates L1, L2, and A.

The pilot or co-pilot may then set a waypoint having coordinates L1, L2, and A (and a speed value S in some instances) for the aircraft by actuating a control (e.g., one of the controls on the additional user input interface 212) to provide a command signal to the processor 206. In response to this command signal, the processor 206 sets a waypoint having coordinates L1, L2, and A for the aircraft. In addition, the pilot or co-pilot may actuate other controls (e.g., one of the controls on the additional user input control interface) to provide additional information regarding the waypoint, such as its position on a waypoint list. As used herein the, "setting" a waypoint refers to the process for adding a new waypoint to the flight plan of the aircraft, including updating the navigation database 108 (FIG. 1) to reflect the position of the waypoint. The waypoint will also be visible on a non-illustrated waypoint list.

In addition, the pilot or co-pilot may maneuver cursors 244, 300, and 366 and visual indicators 302 and 368 to a position that corresponds to an existing waypoint. Alternatively, the user interface 202 may include a separate control (e.g., one of the controls on the additional user input interface 212) to cause cursors 244, 300, 366 and visual indicators 302, 368 to move the position of an existing waypoint. The pilot or co-pilot can then change the coordinates of the existing waypoint by changing the positions of cursors 244, 300, 366 and visual indicators 302, 368. When the waypoint is positioned at a desired location (e.g., L1, L2, and A) the pilot or co-pilot may actuate a control (e.g., one of the controls on the additional user input interface 212) to reset the waypoint.

Allowing the pilot or co-pilot to create a new waypoint, or adjust the position of an existing waypoint, using the cursors 244, 300, 366 and visual indicators 302, 368 provides a method for setting a waypoint that does not require interaction with the pop-up menus or other menu-driven systems. In addition, this method for setting a waypoint provides the pilot with a visual representation (e.g., the positions of cursors 244, 300, and 366 and visual indicators 302 and 368) of the position of the waypoint relative to the current position of the aircraft and any intervening obstacles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for use on a vehicle, the display system comprising:
   a cursor control device;
   at least one electronic display for simultaneously displaying (i) a first image comprising a first movable cursor and a three-dimensional conformal view of a terrain and (ii) a second image comprising a second movable cursor and a two-dimensional view of the terrain; and
   a processor, coupled to the cursor control device and the at least one electronic display, wherein the processor is configured to:
      move the first movable cursor on the first image in response to input from the cursor control device and to determine a latitude and a longitude that correspond to the position of the first movable cursor,
      determine an altitude value that corresponds to the first movable cursor, and
      position the second movable cursor at a position on the second image that corresponds to the position of the first movable cursor on the first image.

2. The display system of claim 1, wherein the terrain is a three-dimensional conformal representation of a portion of the terrain in front of the vehicle.

3. The display system of claim 1, wherein the movement of the first movable cursor on the first image is confined to a portion of the first image that depicts the terrain.

4. The display system of claim 3, wherein the processor is further configured to change the shape of the first movable cursor to conform to the contour of the terrain.

5. The display system of claim 4, wherein the processor is further configured to change the appearance of the first movable cursor when the position of the first movable cursor corresponds to a significant location on the terrain.

6. The display system of claim 1, wherein the processor is further configured to determine an altitude value for the second movable cursor that corresponds to the altitude value of the first movable cursor.

7. The display system of claim 6, wherein the first image is displayed on a first electronic display and the second image is displayed on a second electronic display.

8. The display system of claim 1, further comprising:
   a first control coupled to the processor; and
   wherein the processor is further configured to move the first movable cursor such that a distance between the latitude and the longitude for the first movable cursor and the latitude and longitude of the vehicle remains fixed in response to command signals from the first control.

9. The display system of claim 3, wherein the first image further depicts a visual indicator extending upwardly from the first movable cursor.

10. The display system of claim 9, wherein the processor is further configured to determine the altitude value with the position of the visual indicator on the first image.

11. The display system of claim 10, further comprising:
    an altitude control coupled to the processor; and
    wherein the processor is further configured to move the visual indicator to a desired position above the first movable cursor in response to command signals from the altitude control.

12. The display system of claim 10, wherein the processor is further configured to set a waypoint for the vehicle comprising the latitude and the longitude for the first movable cursor and the altitude value for the visual indicator.

13. The display system of claim 9, further comprising:
    a speed control coupled to the processor; and
    wherein the processor is further configured to associate a speed value with the position of the first movable cursor and the visual indicator.

14. A method for an aircraft display system, the method comprising:
    supplying command signals from a cursor control device;
    positioning a first movable cursor on a first image displayed on an electronic display in response to the command signals supplied from the cursor control device, wherein the movement of the first movable cursor is confined to a region of the first image that depicts a three-dimensional conformal view of a terrain in front of the aircraft;
supplying command signals from an altitude control;
displaying a first visual indicator that extends upwardly from the first movable cursor to a desired position on the first image in response to the command signals supplied from the altitude control;
associating, in a processor, a latitude and a longitude with the position of the first movable cursor and an altitude value with the position of the first visual indicator; and
positioning a second movable cursor on a second image that is simultaneously displayed on the electronic display in response to the command signals from the cursor control device,
wherein the movement of the second movable cursor is confined to a region of the second image that depicts a two-dimensional conformal view of the terrain and the position of the second movable cursor on the second image corresponds to the position of the first movable cursor on the first image.

15. The display system of claim 14, further comprising displaying a second visual indicator extending upwardly from the second movable cursor on the second image, wherein the position of the second visual indicator on the second image corresponds to the position of the first visual indicator on the first image.

16. An aircraft display system for setting a waypoint for a vehicle, the aircraft display system comprising:
 a cursor control device;
 an altitude control;
 at least one electronic display for simultaneously displaying:
  a first image comprising a three-dimensional conformal view of a portion of a terrain in front of the vehicle;
  a first movable cursor positioned on the terrain of the first image; and
  a first visual indicator that extends upwardly from the first movable cursor;
  a second image comprising a two-dimensional conformal view of the terrain;
  a second movable cursor positioned on the terrain of the second image; and
  a second visual indicator that extends upwardly from the second movable cursor; and
 a processor coupled to the cursor control device, the altitude control, and the at least one electronic display and configured to:
  position the first movable cursor on the terrain in response to command signals from the cursor control device;
  determine a latitude and a longitude for the first movable cursor based on the position of the first movable cursor on the terrain;
  position the first visual indicator above the first movable cursor in response to command signals from the altitude control;
  determine an altitude value based on the position of the first visual indicator;
  set the waypoint comprising the latitude and the longitude for the first movable cursor and the altitude value for the first visual indicator;
  position the second movable cursor on the second image at a location that corresponds to the position of the first movable cursor on the first image; and
  position the second visual indicator on the second image at a position that corresponds to the position of the first visual indicator on the first image.

* * * * *